United States Patent [19]

Pflueger et al.

[11] Patent Number: 5,201,045
[45] Date of Patent: Apr. 6, 1993

[54] ARRANGEMENT AND METHOD OF DOWNLOADING DATA TO A PLURALITY OF DESTINATIONS IN A DIGITAL TELEPHONE SYSTEM

[75] Inventors: Michael W. Pflueger, Glendale, Ariz.; Mark S. Dailey, Novato, Calif.; David A. Slobodianuk; Daniel L. Fox, both of Phoenix, Ariz.; Richard Rainer, Scottsdale, Ariz.; Thomas C. Bissonnette; Anthony J. Baca, both of Glendale, Ariz.; Rainer Fischer; Edward Lesniak, both of Phoenix, Ariz.; Ross E. Fraser, Glendale, Ariz.

[73] Assignee: AG Communication Systems Corporation, Phoenix, Ariz.

[21] Appl. No.: 615,522

[22] Filed: Nov. 19, 1990

[51] Int. Cl.5 .......... G06F 11/00; H04M 3/42
[52] U.S. Cl. .............. 395/575; 371/37.1; 379/201; 379/207
[58] Field of Search ........... 379/201, 207, 221, 355; 370/110.1; 371/37.1; 395/575, 200; 364/280.6

[56] References Cited

U.S. PATENT DOCUMENTS

| | | | |
|---|---|---|---|
| 4,747,127 | 5/1988 | Hansen et al. | 379/201 |
| 4,788,720 | 11/1988 | Brennan et al. | 379/201 |
| 4,928,306 | 5/1990 | Biswas et al. | 379/201 |
| 4,935,956 | 6/1990 | Hellwarth et al. | 379/201 |

Primary Examiner—Charles E. Atkinson
Attorney, Agent, or Firm—Anthony J. Baca

[57] ABSTRACT

A method is disclosed for distributing operating program data stored in a common memory area of a digital telephone system, to a plurality of digital telephone system controllers. The method includes transmitting the operating program data from the common memory via a control/data bus to remotely located digital facility test card. The digital facility test card receives and stores a load image of the operating program in random access memory (RAM). A PCM network connection is established from the digital facility test card to each of the plurality of digital telephone controllers through the digital telephone system. The stored load image from the digital facility test card RAM is then transmitted to each of the digital telephone system controllers via the PCM network connection.

7 Claims, 10 Drawing Sheets

ARRANGEMENT AND METHOD OF DOWNLOADING DATA TO A PLURALITY OF DESTINATIONS IN A DIGITAL TELEPHONE SYSTEM

CROSS-REFERENCE TO RELATED APPLICATIONS

Cross-reference is made to related U.S. patent applications titled:, "A Digital Phone System," Ser. No. 07/615,528filed on Nov. 19, 1990. "A Circuit For Testing Digital Lines," Ser. No. 07/615,529 filed on Nov. 19, 1990; and "A Message Arrangement And Method For Implementing A Digital Telephone System," Ser. No. 07/615,529 filed on Nov. 19, 1990, all filed on the same date and by the same assignee as the present Application.

BACKGROUND OF THE INVENTION

1. Field of the Invention

The present invention relates in general to telecommunication systems, and more particularly, to a method for distributing a telecommunication data base to a plurality of digital telephone system controllers.

2. Description of the Prior Art

Presently known implementations of programmable telephones load the operational and functional software into the instrument itself. The "Intelligent" digital telephone communicated or passed control and operational messages directly to the host system central processor complex. Since modern CO exchanges operate in real time, software processing of such real time requests for operational service from a plurality of "Intelligent" telephone instruments severely impact the operation of the CO exchange.

Further, the control protocol software used by the "smart" telephone instrument for its operation is usually resident in Read Only Memory (ROM) within a processor complex of the telephone instrument. Any operational changes required to be made to the instrument entailed replacement of the ROM.

Telephone instrument specific call processing routines and user defined features for such instruments are normally either contained in the telephone instrument or in a data base located in the central processor complex of the CO system.

It is more advantageous to provide a digital telephone instrument that is basically "less intelligent" that interfaces and communicates to a digital telephone controller resident in the line interface of the CO. In this particular configuration the digital telephone sends requests to the controller, and the controller sends back responses to the digital telephone for controlling its functions. Only those messages required for call processing are transmitted from the controller to the CO central processing complex. All software required in the functional operation of the features of the digital telephone instrument are resident in the controller at the CO site.

Such a system is taught by co-pending U.S. patent applications, Ser. No. 07/615,528 filed on Nov. 19, 1990 titled, "A Digital Phone System, " and Ser. No. 07/615,523 filed on Nov. 19, 1990 titled, "A Message Arrangement And Method For Implementing A Digital Telephone System," both having a common assignee with the present invention.

In the above mentioned system the telephone instrument controller contains the generic operating program for the instrument as well as a data base of user programmed custom features.

The operating program and generic data base for each instrument contains approximately 180K bytes of data. To load this data serially, using the CO systems memory mapping techniques, would require approximately eight minutes of system time to load approximately 256 telephone instruments. This overhead in system time can cause major problems in the normal call processing operation of the CO system. Since each telephone instrument controller contains a 64 Kbps PCM port for transmission of voice and data from the digital telephone instrument to the CO system, it would be advantageous to use the PCM network to broadcast the data to all the controllers in the digital telephone system simultaneously. A single PCM channel could transmit the entire load to all controllers in the example above in approximately 23 seconds.

It therefore becomes the object of the present invention to provide a method for distributing via a PCM channel the operating program data of a digital telephone system, from the CO system to a plurality of digital telephone system controllers.

SUMMARY OF THE INVENTION

In order to accomplish the object of the present invention there is provided a method for distributing operating program data within a digital telephone system. The operating program data and generic data base is transferred from a common memory area of the digital telephone system to a plurality of digital telephone system controllers. The method of the present invention comprises the steps of first, retrieving the operating program data base from the common memory of the digital telephone system and transmitting via a sense/-control data bus the retrieved program data to a remotely located digital facility test card. The digital facility test card stores a load image of the operating program data in Random Access Memory (RAM)

Next, each of the plurality of digital telephone system controllers is polled, to establish which of the plurality of digital telephone system controllers requires to be loaded with the operating program data. A PCM network connection is then established from the digital facility test card, through the digital telephone system, to each of the digital telephone system controllers that require loading. The stored load image is then transmitted from the digital facility test card via the PCM network connection, to each of the connected digital telephone system controllers.

Each of the connected digital telephone system controllers is again polled to establish if the load image was received. The digital telephone system controllers that were successfully loaded are then disconnected from the PCM network connection.

Finally, the transmission of the load image from the digital facility test card to the still connected digital telephone system controllers is repeated. Each of the connected digital controllers are again polled until all of the plurality of digital telephone system controllers which required loading have received the operating program data.

DESCRIPTION OF THE DRAWINGS

A better understanding of the invention may be had from the consideration of the following detailed description taken in conjunction with the accompanying drawings, in which:

FIG. 9, comprised of FIGS. 9A and 9B, is a system flow diagram of the process used by the Digital Facilities Line Cards for receiving and verifying the Load Image, in accordance with the present invention.

DESCRIPTION OF THE PREFERRED EMBODIMENT

Figure 1:
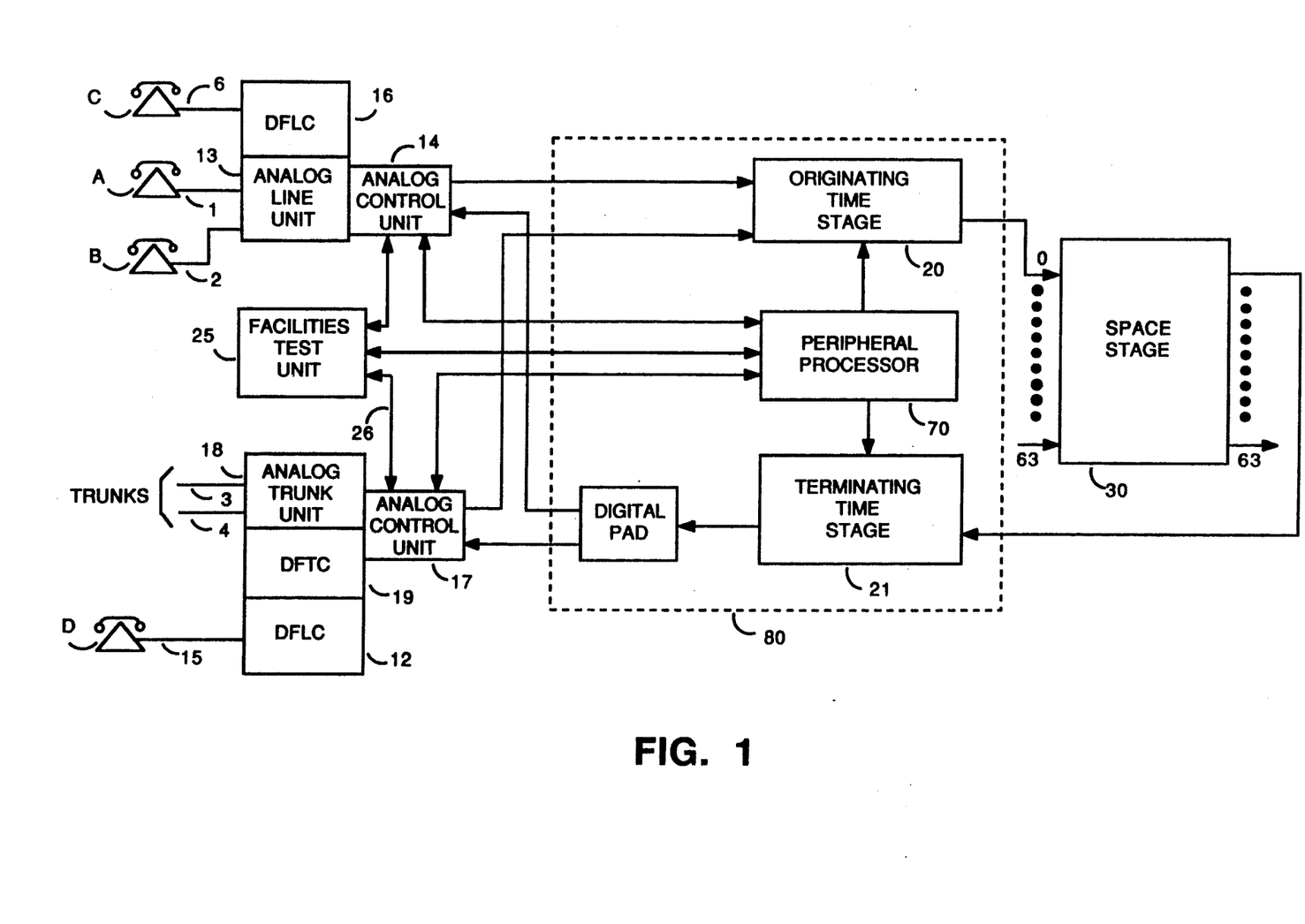
FIG. 1 is a block diagram of a telecommunication network system embodying the present invention.

Turning to FIG. 1 of the included drawings, a central office (CO) telecommunication network system is shown of the type in which the invention is used to advantage. It will be appreciated by those skilled in the art, that the following description of the CO system is for the purpose of explaining the operation of the present invention. The CO system shown in FIG. 1, forms only a working environment that represents one of a plurality of digital networks or systems in which the present invention may be applied.

Standard telephone instruments A and B are connected to Analog Line Unit 13, via analog subscriber lines 1 and 2. A Digital Telephone Instrument (DTI) C is connected to a Digital Facility Line Card (DFLC) 16 via an analog two-wire subscriber line 6. For an explanation of the capabilities of the DTI C and the DFLC 16, reference may be had to co-pending U.S. patent application Ser. No. Ser. No. 07/615,523 filed on Nov. 19, 1990, titled, "A Digital Phone System". The analog data received from instrument A and B is converted to Pulse Coded Modulation (PCM) by Analog Line Unit (ALU) 13. Instrument C converts the received analog to PCM prior to transferring to Analog Control Unit (ACU) 14. The PCM digital data is next sent from ALU 13 through ACU 14 to Originating Time Switch (OTS) 20. PCM data received from the other end is received by ALU 13 from Terminating Time Switch (TTS) 21 through ACU 14. ALU 13 converts the received PCM data to an analog signal which is transmitted down subscriber lines 1 and 2. PCM data received by ALU 13 is sent to subscriber line 6 without PCM conversion. ALU 13 is also connected to ACU 14, which in turn, is connected to Peripheral Processor (PP) 70.

Terminating Time Switch is further connected to Trunk Unit 18 through ACU 17. Trunks 3 and 4 provide access to subscribers not directly served by this system. OTS 20, TTS 21, PP70 and the Digital Pad comprise a Time and Control Unit (TCU) 80 of the CO system.

Facilities Test Unit 25 (FTU) is connected to all ACUs by a pair of test busses; Test Bus In and Test Bus Out. The FTU includes analog test equipment for determining the status of any line. Under control of PP 70, the FTU performs various electrical and acoustical tests on the lines of the system.

The Digital Facilities Test Card (DFTC) 19 is connected to ACU 17 and provides an interface for one Customer Premises Equipment (CPE). Through a set of relays, the DFTC 19 has access to outgoing line 15 and test bus 26. With these relays and the aid of FTU 25, the DFTC 19 can be connected to any line card or any line within the CO system. Additionally, the DFTC 19 can be used to receive, store and transmit data over the PCM network. This function of the DFTC 19 is used to perform the data distribution of the present invention. A more detailed explanation of the DFTC can be had by reference to co-pending U.S. patent application Ser. No. Ser. No. 07/615,529 filed on Nov. 19, 1990, titled, "A Circuit For Testing Digital Lines".

DFLC 16 and 12 connected to analog control unit 14 and 17 respectively provide an interface for up to two DTIs. The primary objective of DFLCs 16 and 12 is to appear to ALUs 14 and 17 and PP 70 as standard subscriber lines. This objective requires the DFLCs to perform a significant amount of the call processing functions associated with the voice transmissions from and to the DTIs C and D, thereby, off-loading these functions from PP 70.

Figure 2:
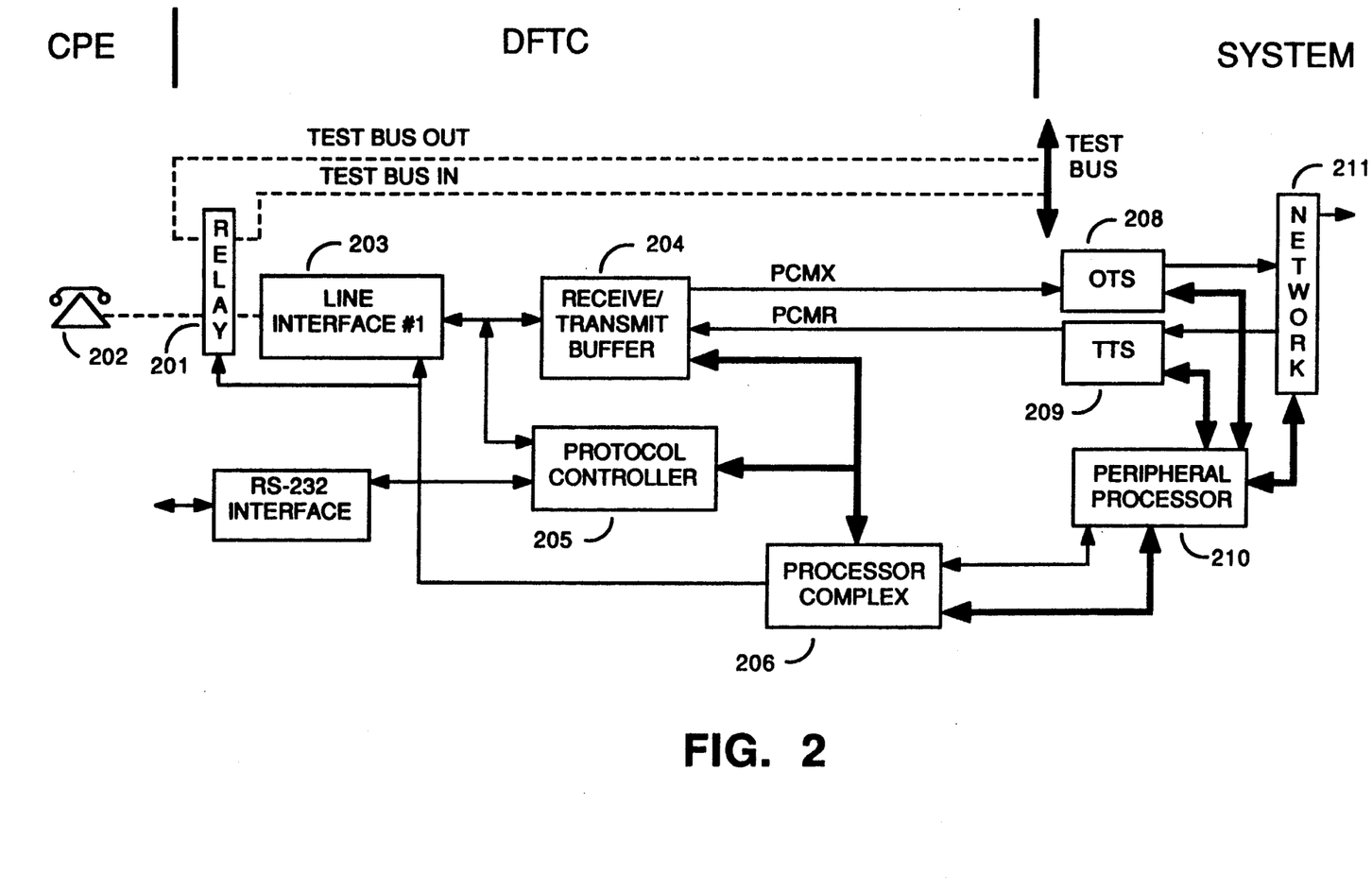
FIG. 2 is a high-level block diagram of the Digital Facilities Test Card used with the present invention.

Turning now to FIG. 2, a block diagram illustrating the DFTC 19 is shown. The DFTC interfaces to the CPE (or Unit Under Test (UUT)) through a single, two-wire communication link. The two-wire interface provides a high-speed, full duplex digital transmission link using echo-cancelling techniques. A total of four digital channels are provided: two 64 Kbps channels, one 16 Kbps channel and one 8 Kbps channel. Where, the 64 Kbps channels can be used for PCM voice or high-speed data, the 16 Kbps channel is used to communicate with the UUT, and the 8 Kbps auxiliary channel is used to communicate with other devices on the line, (i.e. repeaters) and/or with the CPE. The two-wire communication link can be redirected, by RELAY 201, to the test busses.

The DFTC interfaces to the CO system by a PCM interface and a sense/control interface. Data over the PCM interface is transferred to Originating Time Switch (OTS) 208 and received from Terminating Time Switch (TTS) 209. This data is either digitized voice data or circuit switched data and has a data rate of 64 Kbps. (Herein: PCM data means either digitized voice or circuit switched data.)

Through the sense/control interface, PERIPHERAL PROCESSOR (PP) 210 communicates with DFTC PROCESSOR COMPLEX 206, which in turn communicates to the UUT. The sense/control interface consists of eight data lines, four address lines, and associated control lines. Only high-level messages are passed through this interface.

When PP 210 sends a message to the DFTC, it writes the message into the DFTC's input buffer, then sets a SYSDFTC flag on the DFTC. The DFTC, upon receiving the SYSDFTC flag, reads the message and resets the flag indicating to PP 210 that it is ready for another message. Conversely, when the DFTC sends a message to PP 210, it writes the message into its output buffer and sets a DFTCSYS flag. When PP 210 sees the DFTCSYS bit set it reads the message from the DFTC and resets the DFTCSYS flag.

PROTOCOL CONTROLLER 205 handles the "bit-level" protocol conversion, thereby, providing a very reliable data link between the DFTC and the UUT. PROTOCOL CONTROLLER 205 also provides a serial port which can be used during software design and testing.

RECEIVE/TRANSMIT BUFFER 204 converts the serial data between the different bit rates of LINE INTERFACE 203, and OTS 208, provides a time switch stage, and performs a trap and insert function. The trap/insert function allows the DFTC's processor 206 to place known data patterns onto the PCM data stream and receive data from the PCM data stream. This function is used to perform diagnostic testing and the uploading and downloading of digital in accordance with the present invention.

LINE INTERFACE 203 converts the digital data into an appropriate signal for transmission over the twisted-pair line. The signal from the LINE INTERFACE first passes through RELAY 201. At RELAY 201, the signal is diverted to one of three busses: LINE OUT, TEST BUS OUT, or TEST BUS IN. The LINE OUT bus directs the signal to the two-wire interface associated with that card slot, in this case, line out is connected to phone 202. The Test busses (TEST BUS IN and TEST BUS OUT) are a common bus between all card slots of all ALUs.

Figure 3:
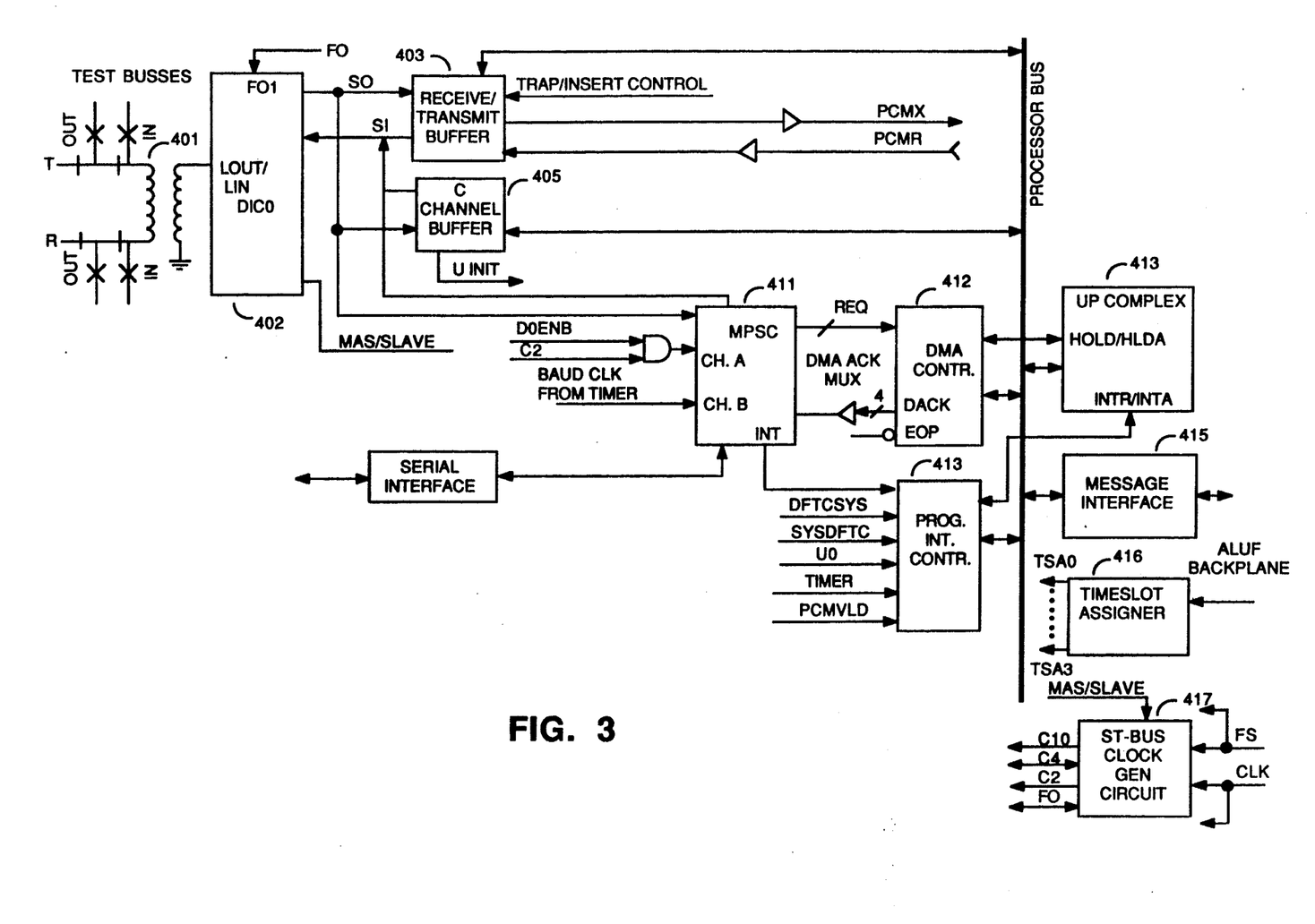
FIG. 3 is a low-level block diagram of the Digital Facilities Test Card shown in FIG. 2, and used with the present invention.

Referring now to FIG. 3, a more detailed description of the DFTC will be given. TRANSFORMER 401 and Digital Interface Chip (DIC) 402 implement LINE INTERFACE 203 of FIG. 2. The DIC 402 provides an interface between the line (Tip-and-Ring) on one side, and a Time Division Multiplexed (TDM) serial data-stream on the other. DIC 402 uses four TDM time-slots; two channels for the high-speed data, one channel for the link with the UUT, and a channel for control and status of the DIC itself. Note: The auxiliary channel is part of the control/status channel. The RELAY 201 of FIG. 2 is shown as "MAKE/BREAK" on the Tip (T) and Ring (R) lines. A straight vertical line represents the connection that is made when the relay is in the relaxed state, while an x indicates the connection that will be made when the relay is energized.

RECEIVE/TRANSMIT BUFFER 403, converts the bit-rate between the system (PCMX and PCMR) and the DIC 402 while preserving the overall data-rate of the channel. Depending on the mode of operation, either master or slave, RECEIVE/TRANSMIT BUFFER 403 is under the control of either TIME-SLOT ASSIGNER 416 and CLOCK GENERATOR 417 or DIC 402 and CLOCK GENERATOR 417 respectively. TIMESLOT ASSIGNER 416 is programmed by the external peripheral processor, and determines the time slots for each high-speed channel on the PCMX and PCMR busses. CLOCK-GENERATOR 417 produces all the timing signals needed by DIC 402 and, when in the master mode, is phased locked to a master clock signal provided by the system. When the DIC is in the slave mode, DIC 402 generates the signals C4 and OF. Under the control of CLOCK-GENERATOR 417, the buffers are enabled, during the proper time-slot, to receive and transmit serial data from the DIC.

CLOCK-GENERATOR 417 also provides timing for C CHANNEL BUFFER 405 and Multi-Protocol Serial Controller (MPSC) 411. The C CHANNEL BUFFER provides an interface between PROCESSOR COMPLEX 414 and DIC 402. Through this channel, PROCESSOR COMPLEX 414 can control certain internal functions of the DIC and monitor internal status. The C CHANNEL BUFFER converts the data between the parallel format of PROCESSOR COMPLEX 414 and the serial format of DIC 402 and allows PROCESSOR COMPLEX 414 to operate asynchronously to DIC 402. The C CHANNEL BUFFER as used in the present invention is taught in U.S. Pat. application, Ser. No. 369,888, titled, "An Interface Circuit For Data Transmission Between A Microprocessor System And A Time-division-multiplexed System". It should be noted that the auxiliary channel used to communicate with other devices on the line, (i.e. repeaters) and/or the CPE, is transferred by the C CHANNEL BUFFER.

MPSC 411 provides bit-level protocol functions, thereby, providing a highly reliable data link between the DFTC and UUT. MPSC 411 also provides a serial data link that can be connected to a terminal. This serial data link is intended to be used during development and testing of DFTC. In the present invention, MPSC has been implemented by a 8274 INTEL chip. Because of the relatively high data rate of these channels DMA controller 412 interfaces MPSC 411 to PROCESSOR COMPLEX 414. This allows data to be transferred between the MPSC and the PROCESSOR COMPLEX with very little processor over-head.

PROCESSOR COMPLEX 414 interfaces to the system through MESSAGE INTERFACE 415. Through this interface, the system passes high-level commands to the DFTC upon which the DFTC performs all the low-level computing and communications with the UUT. PROCESSOR COMPLEX 414 includes an engineerable amount of RAM (not shown) used to store the generic program and customer database.

Figure 4:
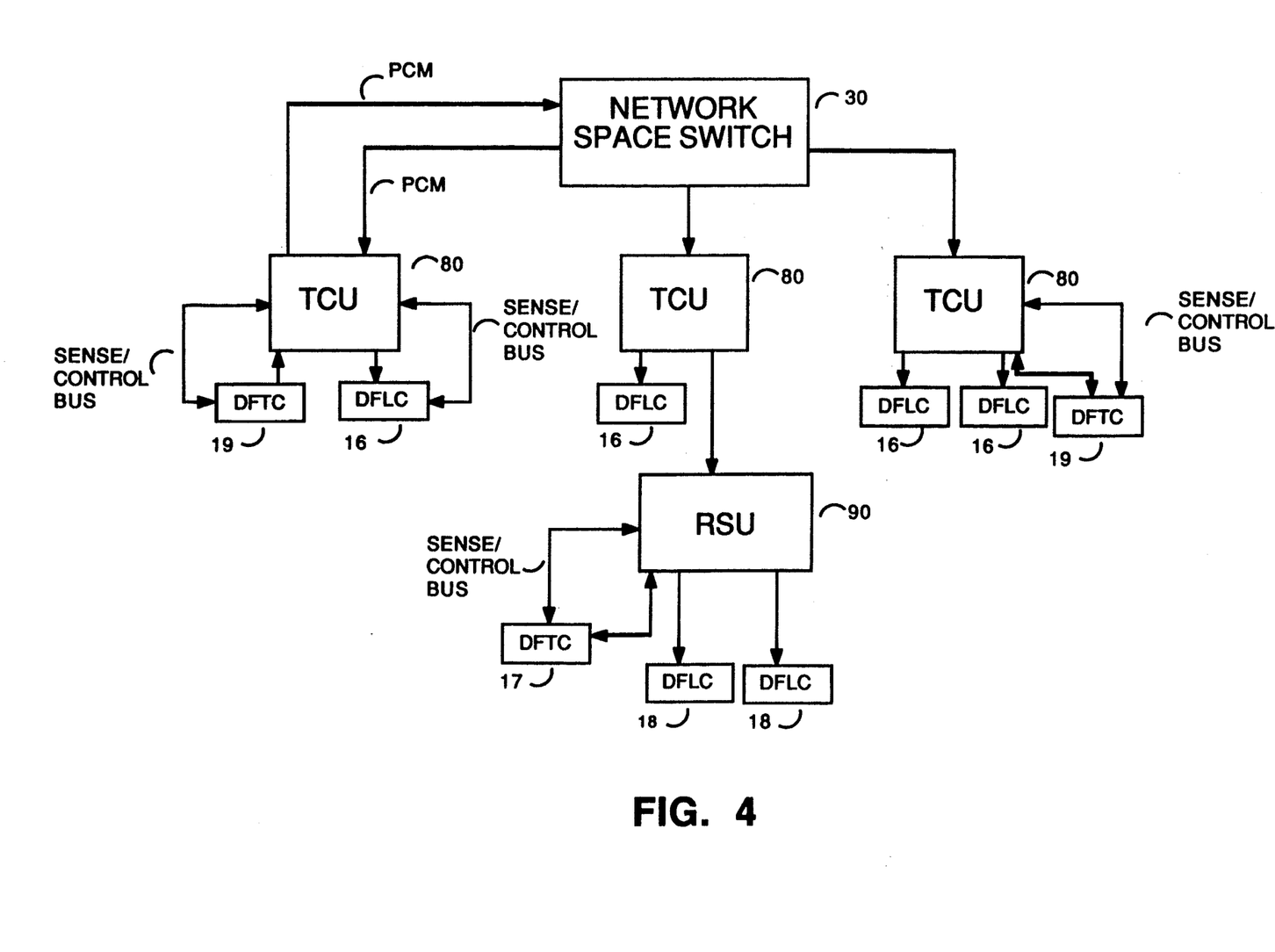
FIG. 4 is a high-level block diagram illustrating the distribution of program data from a single Digital Facilities Test Card to a plurality of Digital Facility Line cards, in accordance with the present invention.

Turning now to FIG. 4, a block diagram illustrating the method used by the present invention to distribute program data to the companion DFLC units of the CO system. From a single DFTC 19 all the DFLCs 16 and DFTCs 17 connected to the network are loaded simultaneously via the PCM bus of the CO system. This does not include any DFLCs 18 connected to a Remote Switching Units (RSU) 90 that are located away from location of the CO system base unit. Remote DFLC 18 can only receive a load from DFTC 17. Therefore, DFTC must be first loaded via the sense/control bus. As explained earlier the DFTC 19 includes a PCM insert register that connects to the PCM bus of the CO system. The insert register loads the program data Load Image on the PCM bus from RAM storage on the DFTC 19. The program data Load Image consists of a generic operational program and a generic database. The generic operational program is a software program that supports all the basic operational commands and features used to interface and operate the DFLC with a DTI and the CO system. The generic database is a database of operational DTI functions that are implemented when the DTI user operates specific keys on the DTI, such as, redial, hold, etc. These generic programs are loaded into the RAM memory of the DFTC from system common memory via the peripheral processor of the associated TCU 80. The initial load of the generic programs uses the sense and control/interface between the TCU 80 and the DFTC 19 via the message interface 414 of FIG. 3.

The Load Image stored in the DFTC 19 is accessed when a request to load all DFLCs or a request to reload only certain DFLCs is received from the CO system. Whenever one or more DFLCs 16 need loading, a network path (normally used for PCM voice samples) is established from the DFTC to all DFLCs which need to be loaded. The DFLCs requiring the load are then instructed by the CO system to "listen" to a particular network space switch 30 PCM time slot and to prepare to be loaded. The DFTC is then instructed to begin transmission. The DFTC then transfers the Load Image from its RAM memory locations into the PCM bus and the network space switch 30 of the CO system. All of the DFLCs of the system receive the transmitted Load Image simultaneously, where they are stored in the RAM of each addressed DFLC.

Each loaded DFLC then indicates to its TCU 80 peripheral processor whether the transfer was successful based on error checking process.

The Load Image is transmitted in segments along with error checking information, to insure error-free transfer. Network connections to the DFLCs that were successfully loaded are dropped and those DFLCs are placed in service. The load is then transmitted again to the remaining cards, which selectively receive the data blocks of the Load Image that were corrupted on the initial pass. Again the successfully loaded cards are placed into service and the process repeats until all DFLCs that required loading are loaded.

Figure 5:
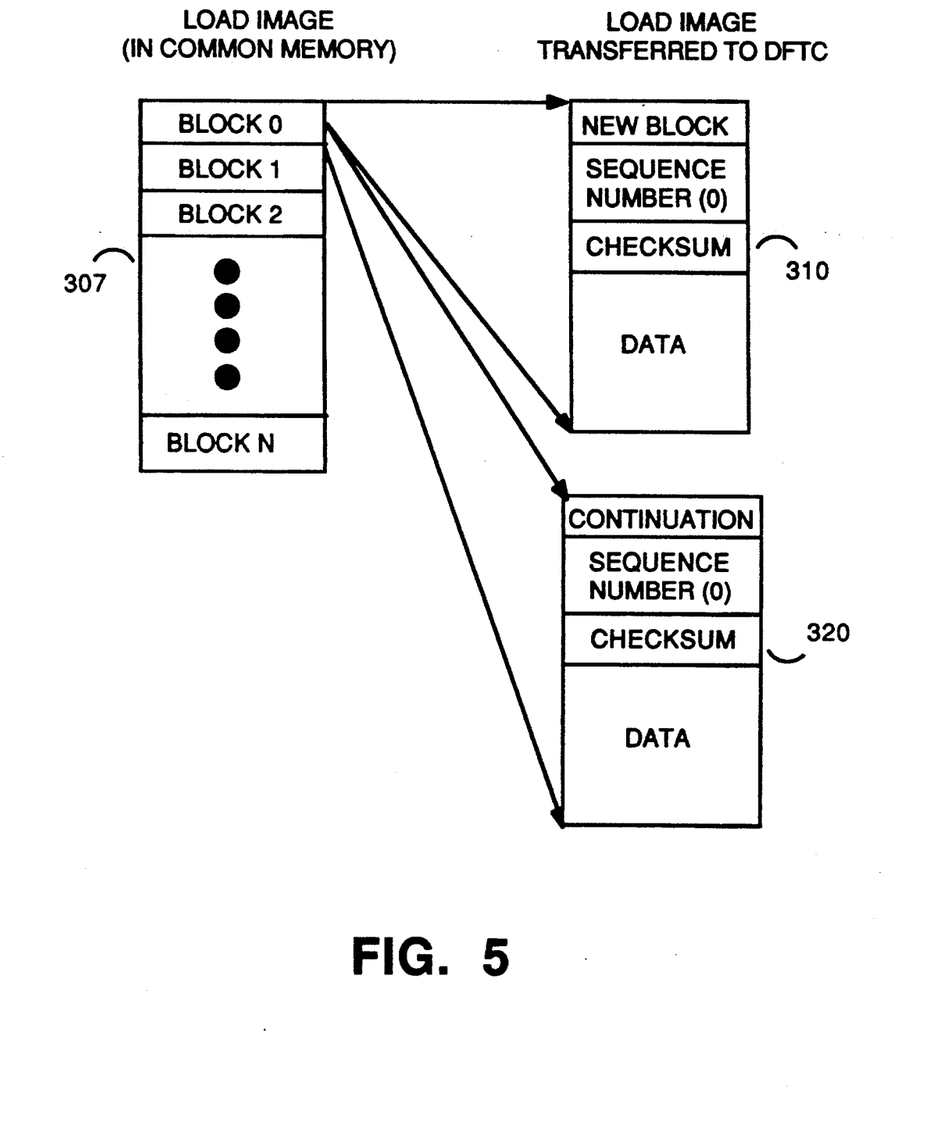
FIG. 5 is a block diagram illustrating the manner in which the generic operational program and the generic database (Load Image) is reformatted for transfer from the common memory of the network system to the Digital Facilities Test Card, in accordance with the present invention.

With reference to FIG. 5 of the included drawings, the manner in which the invention reformats the generic operational program and a generic database (Load Image), for transfer from the common memory of the CO system to the DFTC will now be explained. As described earlier, the DFTC 19 is loaded via a sense and control point from the peripheral processor of the associated TCU 80. The Load Image is stored in a common memory area of the CO system in 512 byte blocks 300. When the data is to be loaded, a memory manager passes a pointer to the start of the buffer that contains the 512 byte blocks along with an associated checksum word to peripheral maintenance. The data is retrieved by peripheral maintenance in the following format.

```
14 Bytes Manage Memory
        Header
    512 Bytes Data
    2 Bytes Checksum
```

Peripheral maintenance will adjust the buffer and form a level 3 header. The data block is transmitted to the DFTC 19 using one New Block 310 and two Continuation block messages 320. The message length specified in the level 3 header is only one byte, so the maximum message length can only consist of 256 bytes of data. Since the data with the checksum and the header is larger than 512 bytes, two Continuation Block messages are needed. The data is formatted in the following format.

```
3 Bytes Level 3 Header
1 Byte Message Type
2 Bytes Block Sequence
       Number
2 Bytes Checksum
251 Bytes Data
```

Once the data contained in the Load Image is reformatted the data is transferred to the DFTC 19 along the sense and control interface (Message Interface 415 of FIG. 3) of the DFTC 19 from the peripheral processor. The data is transferred in the sequence shown in FIG. 6.

When loading, only five distinct message types can be accepted by the DFTC 19. These are, Abort, New Block, Continuation Block, EOF (End Of File) and Reset Load. Any message received other than the ones listed will cause an error message to be sent to the CO system, indicating that an unexpected message was received. Although not shown in FIG. 6, at any point during the loading of the DFTC 19 an abort message occurs, an Abort Load function will execute and the loading process will end. The DFTC will immediately send the CO system a Load Aborted message.

Figure 6:
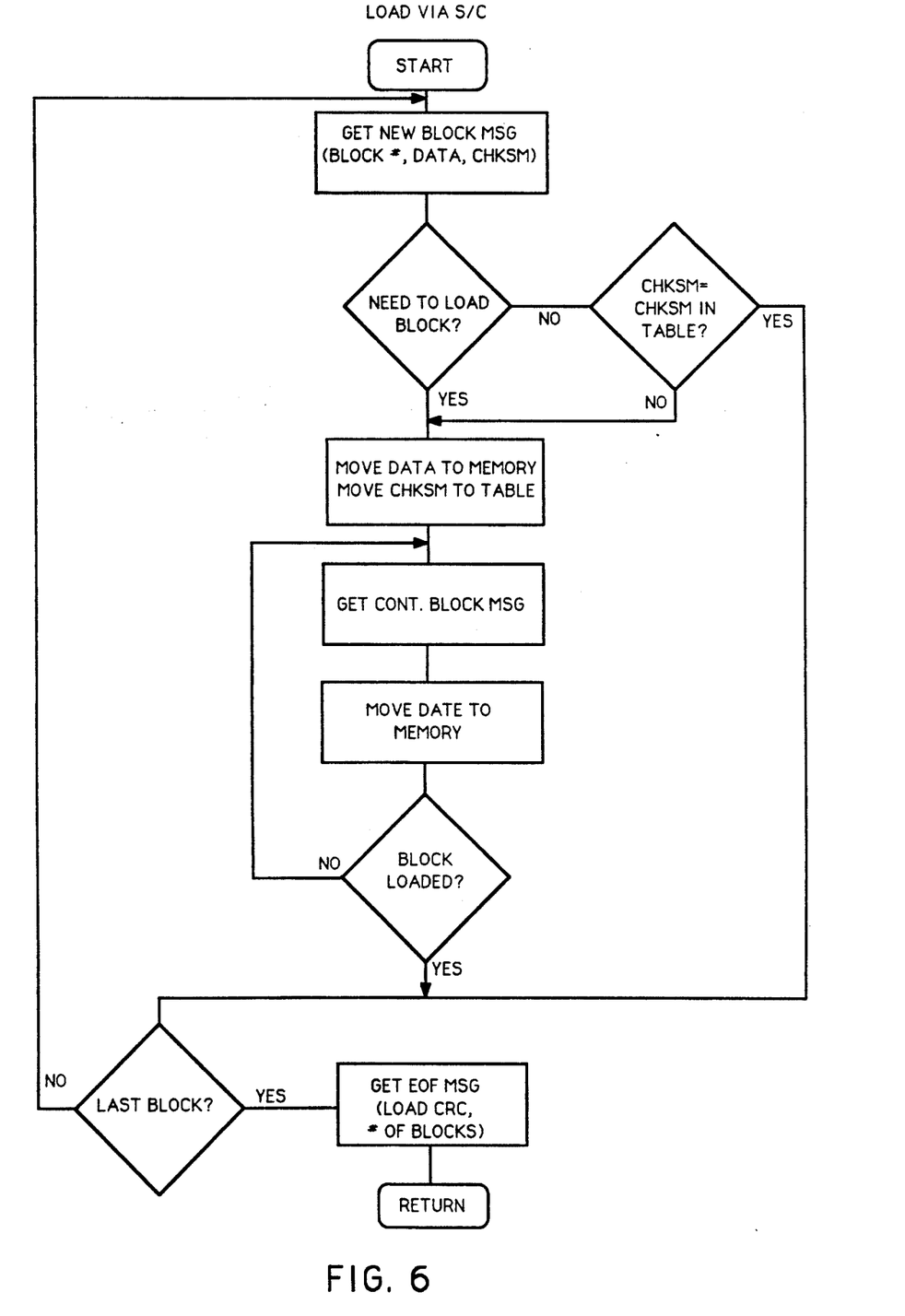
FIG. 6 is system flow diagram of the steps used to load the Load Image from the common memory of the network system to the RAM memory of the Digital Facilities Test Card, in accordance with the present invention.

After each New Block message is received, two Continuation Block messages will be transmitted to fill out the 512 bytes of a data block. If the data block is not required to be loaded, the DFTC controller will process the message but will not load the data into the DFTC RAM memory. If the block is to be loaded, the data is moved to the RAM and the checksum word to a checksum table. This process is repeated until the last block of data is loaded. An EOF message is sent to indicate the end of the data load. The parameters of the EO include the total number of blocks loaded and the CRC for the entire load. After the EOF, a load verification function is executed by the DFTC processor, ascertaining if all the data was received. The Load Image is then stored in the DFTC's RAM memory in the same relative 512 byte blocks as in the common memory of the CO system.

Only one DFTC 19 needs to be loaded with the Load Image within the CO system served by the network space switch. All DFLCs 12 and 16 connected through the space stage can be addressed and connected to the PCM bus of the CO system for accepting the transmitted Load Image Before a PCM path between the DFTC and the DFLCs of the system is established, a reset of the DFTC is initiated by the TCU peripheral processor. The reset executes a self test and load verification of the selected DFTC insuring that the Load Image stored in the DFTC is not corrupted. If the self test passes and the Load Image is verified, then a status report message is sent to the system indicating that the DFTC can be selected as a sender. If the DFTC self test or the load verification fails the self-test, a message will be sent from the DFTC to the CO system indicating that the selected DFTC cannot be selected for transmitting the Load Image unless the selected DFTC is serviced or reloaded.

Figure 7:
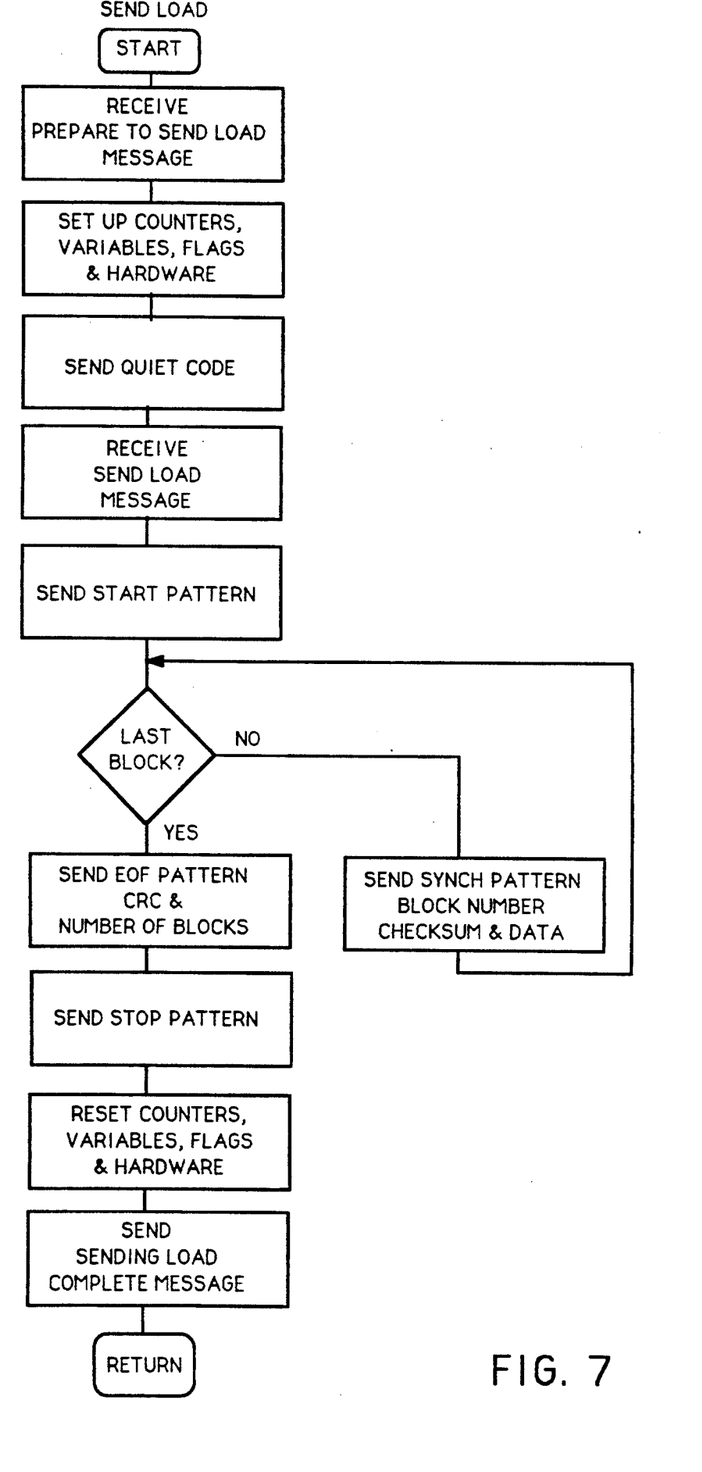
FIG. 7 is a system flow diagram of the steps used to send the Load Image from the Digital Facilities Test Card to the Digital Facilities Line Cards, in accordance with the present invention.

Upon selection as a sender, the CO system sends a Prepare to Send Message to the DFTC. The DFTC then inserts a Quiet Code (a byte of data with a fixed value) into the PCM insert register. The insert register is then enabled and the Quiet Code transmitted on the established PCM path to the DFLCs that require loading. The Quiet Code is transmitted to insure that the DFLCs are "listening" and to indicate that the sending of the Load Image has not started. Once the PCM path between the sending DFTC and the receiving DFLCs is established by the CO system, a Send Load message is sent to the sending DFTC from the CO system to begin transmission of the Load Image to the PCM bus. The transmission of the Load Image is accomplished in the form and sequence illustrated in the flow chart of FIG. 7. When the system is first initialized, one DFTC card in the CO and one DFTC in each RSU are loaded via the sense/control bus. This load is then broadcast to all other DFTCs and DFLCs within the system. That is, a DFLC in the CO can only receive the PCM load from a DFTC in that same CO likewise for RSUs.

During normal operation, DFLCs will occasionally need to be reloaded because of memory failure, card replacement, etc. When a DFLC is replaced, it can receive a load via either the sense and control bus or the PCM bus. If it is to receive its load over the PCM bus, then a PCM path is set-up and the DFTC sends the load. Note there is no need to resend the load to the DFTC via the sense/control bus first assuming the load has not changed nor been corrupted in the DFTC.

Figure 8:
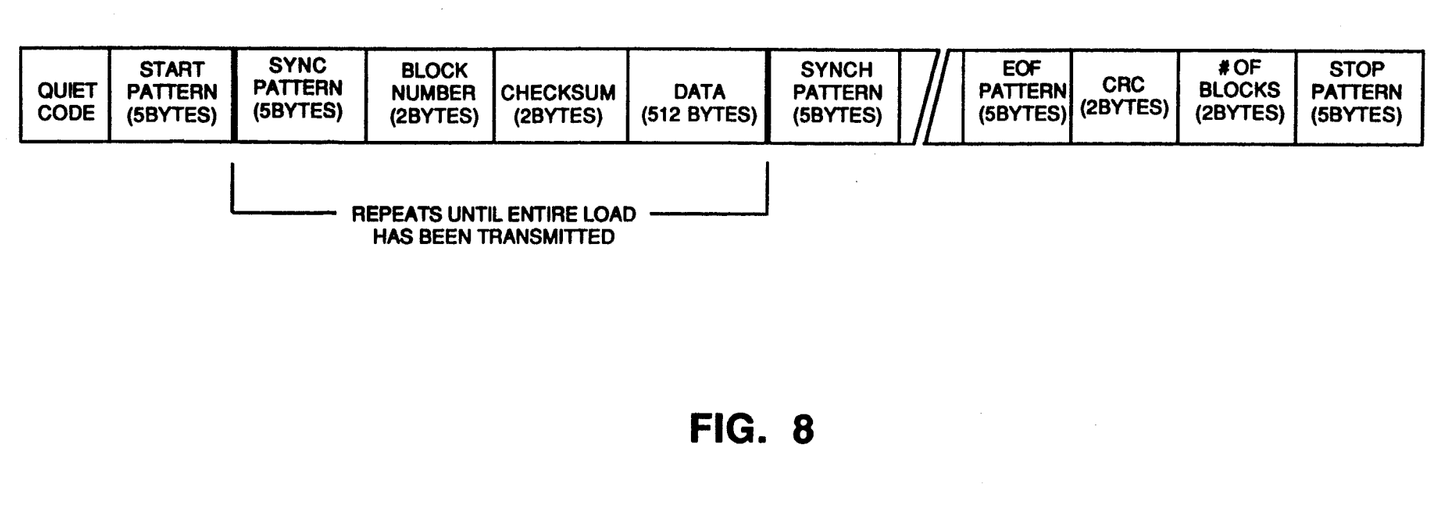
FIG. 8 is a block diagram illustrating the PCM message protocol used to transmit the Load Image on the PCM data bus, in accordance with the present invention.

Turning now to FIG. 8 the format protocol of the PCM transmission is illustrated. As explained above, the Quiet Code is a byte of data with a fixed value, that is transmitted until the Send Load message is received by the DFTC. The Start Pattern is a 5 byte bit pattern that informs the receiving DFLC that it is about to receive the actual load. The Synchronize Pattern is also 5 bytes in length that allows the receiving DFLC to continue loading from wherever possible when synchronization is lost. This enables the receiving DFLC to continue loading data blocks and only forfeit those blocks that were transmitted while attempting to resynchronize. The Block Number is a two byte count of the Data Blocks being loaded in sequential order. Next a Checksum word is transmitted that is computed for its associated block. After the Checksum, a data block of the Load Image is transmitted. The blocks between the Sync patterns are repeated until the complete Load Image is transmitted from the DFTC. An End of File (EOF) pattern is transmitted to the receiving DFLCs indicating that the Data transmission has ended. A CRC word is next transmitted for the entire load. A two byte Number of Blocks field is sent indicating the number of data blocks transmitted and, finally, a Stop pattern is transmitted indicating to the receiver that the DFTC is going to stop sending.

Figure 9A:
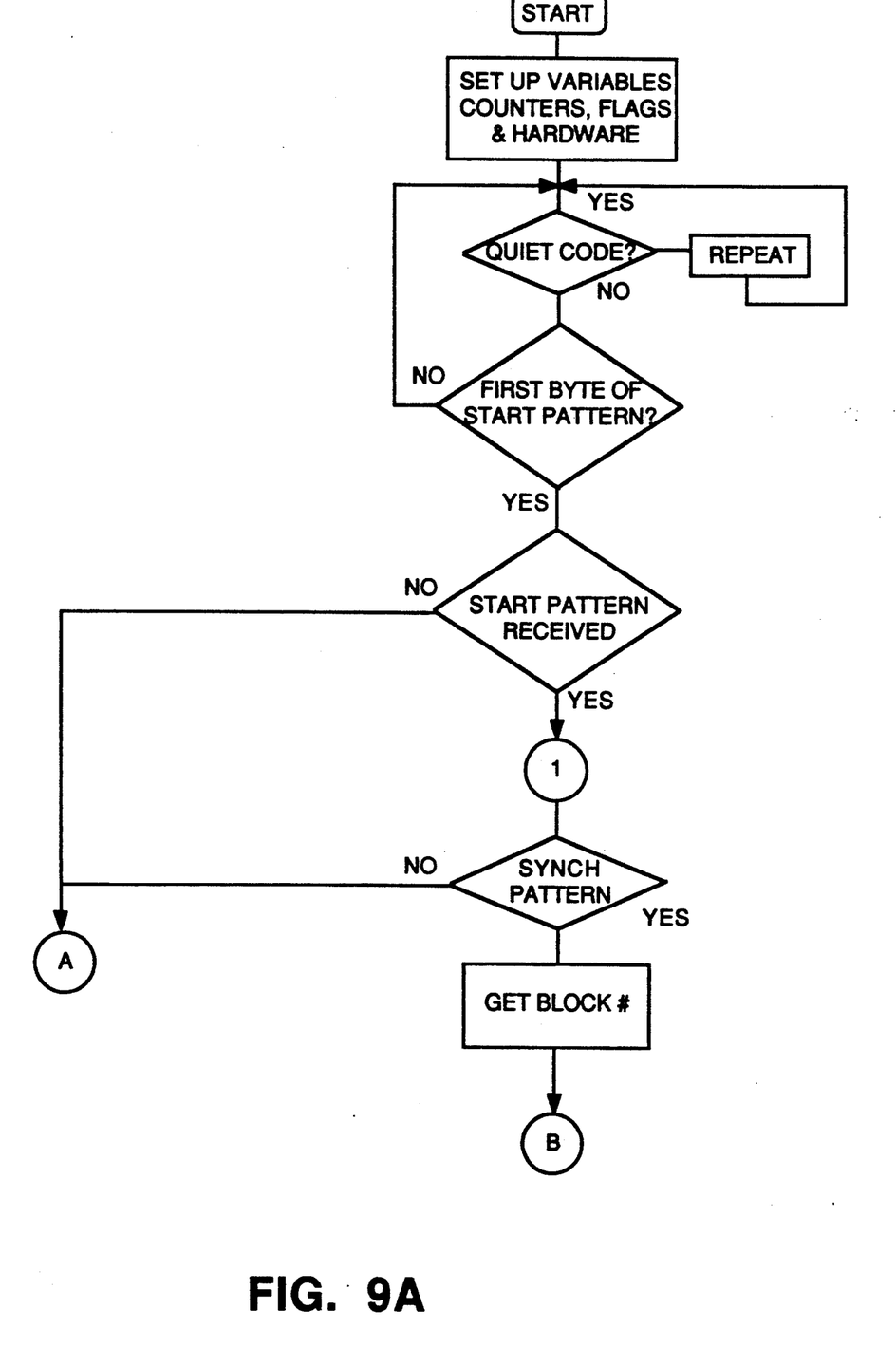
Figure 9B:
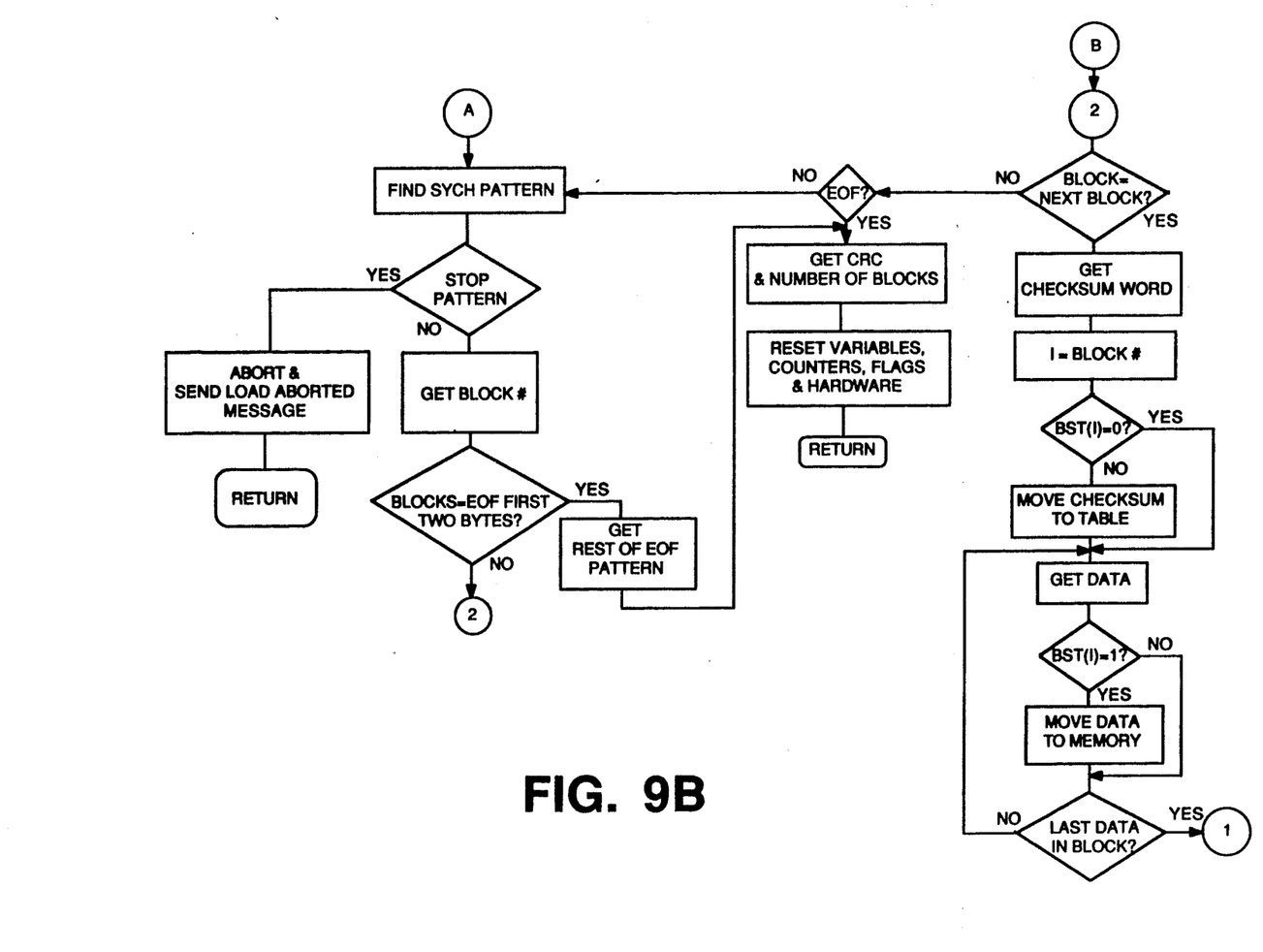

FIG. 9 illustrates the method in which the receiving DFLC handles the transmitted Load Image. After receiving a Reset Load Image message with parameters, indicating a partial or a mandatory load via the PCM bus A DFLC Load via PCM will start executing as illustrated in FIG. 9. Variables, counters, flags and hardware required to capture the transmitted load are first setup by the receiving DFLC. The path through the network from the transmitting DFTC has been set up by the system and a time slot assigner on the DFLC has been programmed to allow the DFLC to receive data at a PCMVLD (PCM Valid) interrupt. At this point the receiving DFLC will enter a loop, waiting to receive Quiet Code. The receiving DFLC will be expecting to receive the Start Pattern followed by the Sync Pattern and then the Block Number. In the instance that the DFLC does not find the Start Pattern, or the Block Number sequence is incorrect, the DFLC will try to resynchronize.

A Bit Status Table (BST) resident in the operating program of the DFLC includes a bit map of the entire DFLC memory. The table indicates the status of each block resident in the DFLC memory. A "1" in the BST associated with a particular data block, would indicate that the block in memory needs to be loaded. Whereas, a "0" in the BST indicates that the block is valid and does not require to be loaded. If the block being transmitted needs to be loaded (BST=1) the checksum received is moved to a checksum table and the data comprising the transmitted block will be moved to memory, until all of the data is captured.

Conversely, if a data block that is being received does not require to be loaded due to the corresponding block in DFLC memory being valid (BST=0) the checksum and block are received but the checksum and data are not moved to the checksum table and memory, respectively. This process is repeated until all of the transmitted blocks are captured and loaded in into the DFLC memory.

If synchronization is lost between the DFTC and the receiving DFLC a resynch is attempted by the DFLC. The loading routine will look for the next synchronization pattern. If the Stop Pattern is encountered then the load will aborted and a Load Aborted message will be transmitted to the CO system. After receiving the next Synchronization Pattern the next two byte received will be compared to the first two bytes of the EOF pattern. If they are equal to the first two bytes of the EOF pattern, then an abort message is sent by the FDLC to the CO system. If the two bytes are not equal to the first two bytes of the EOF then it is assumed that the data is the next Block Number count and the loading is continued.

After the EOF pattern is received, the load CRC and the Number of Blocks transmitted is stored by the DFLC. This completes the PCM loading process and the DFLC resets its variables, counters, flags and hardware, thereby, returning control to the calling routine.

After the load is completed the FDLC will verify that the data blocks it received are valid. The load verification is initiated by a Report Status message sent by the system to the FDLC. The load verification starts by comparing the Bit Status Table (BST) to detect any corruption of the tables. If any miscompares are found, then the invalid data block in question will be marked as invalid (BST=1). The checksum for each data block is then calculated and compared with the checksum stored in the checksum table. The BST for each data block is then updated accordingly. If all the data blocks are valid and the CRC is correct then a report message is sent to the system indicating a successful load. If the CRC is valid, but some of the data blocks are invalid, then the DFLC sends a status report to the system indicating that some blocks need to be reloaded. If the checksum passes, but the CRC is incorrect, this would indicate that a least one data block has been corrupted and that the corrupted block is unknown, due to the inaccuracy of the checksum test. In this case all the data blocks will be marked as invalid (BST=1), requiring a complete reloading.

The DFLCs in the CO system which were loaded correctly are brought up on-line by the CO system and the Load Image retransmitted from the DFTC to those DFLCs with invalid data blocks. This operation is repeated until all DFLCs within the CO system are loaded.

Although the preferred embodiment of the invention has been illustrated, and that form described, it will be readily apparent to those skilled in the art that various modifications may be made therein without departing from the spirit of the invention or from the scope of the appended claims.

What is claimed is:

1. A method for distributing operating program data within a digital network system from the common memory area of said digital network system to a plurality of digital controllers, said method comprising the steps of:

retrieving said operating program data from said common memory and transmitting via a sense/control data bus said operating program data to a remotely located digital maintenance unit, said digital maintenance unit storing a load image of said operating program data in program memory;

polling each of said plurality of digital controllers to establish which of said plurality of digital controllers requires to be loaded with said operating program data;

establishing a PCM network connection from said digital maintenance unit to each of said digital controllers that require loading through said digital network system;

transmitting said stored load image from said digital maintenance unit through said digital network system, via said PCM network connection, to each of said connected digital controllers;

polling each of said connected digital controllers to establish if the load image was recited, and disconnecting the digital controllers that were successfully loaded from said PCM network connection; and repeating the transmission of said load image from said digital maintenance unit to said connected digital controllers, and polling each of said connected digital controllers until all of said plurality of digital controllers which required loading have received said operating program data.

2. A method for simultaneously distributing operating program data to a plurality of digital controllers connected to a digital network system, said operating program data stored in a common memory area of said digital network system, said method comprising the steps of:

transmitting said operating program data from said common memory via a control/data bus to a remotely located transmission means, said transmission means receiving and storing a load image of said operating program;

establishing a PCM network connection from said transmission means to each of said plurality of digital controllers through said digital network system; and simultaneously transmitting said stored load image from said transmission means to each of said digital controllers via said PCM network connection.

3. The method as claimed in claim 2, wherein said method further includes the steps of:

polling each of said digital controllers to establish if the load image was received, and disconnecting the digital controllers that were successfully loaded from said PCM network connection; and repeating the transmission of said stored load image from said transmission means to said remaining connected digital controllers, and polling each of said digital controllers that remain connected until all of said plurality of digital controllers received said load image.

4. The method as claimed in claim 3, wherein said digital maintenance means is a digital facilities test card, and said digital facilities test card includes a PCM insert register connectable to the PCM bus of said digital network system, a control/data interface connected to said network system, and a Random Access Memory (RAM) area, and said transmission of said operating program data from said common memory to said digital facility test card is transferred in a sequence format including a New Block Message, a block sequence number, a checksum a data block and any continuing data blocks.

5. The method as claimed in claim 4, wherein said digital facility test card process said operating program data for storage in said RAM as a load image, said processing including the steps of:

(a) receiving said new block message, block sequence number, checksum, and data bock;

(b) checking to ascertain if the block of data being transmitted needs to be loaded;

(c) moving said data block into said RAM and said checksum into a checksum table responsive to the need to load the data block;

(d) receiving a continuing data block and moving said continuing data block to RAM;

(e) ascertaining if all the continuing blocks are loaded;

checking if the last block received is the last block of the operating program;

repeating steps a–d until all blocks are loaded; and receiving an End of File (EOF) message including a load CRC and number of data blocks transmitted after the last block transmitted is encountered.

6. The method as claimed in claim 5, wherein said digital facility test card process said load image for transmission to said plurality of digital controllers via said PCM network connection, said process including the steps of:

(a) said digital facility test card receiving a Prepare to Send Load message via said control/data interface from said digital network system;

(b) enabling said PCM insert register, thereby connecting said digital facility test card to the PCM bus of said network system;

(c) sending a quiet code to said PCM insert register for transmission on said PCM bus, signaling to said plurality of digital controllers of an imminent load image transmission;

(d) receiving a Send Load message from said digital network system and transmitting a Stuart Pattern from said PCM insert register to said PCM bus signaling to said plurality of digital controllers the start of a load image transmission;

(e) fetching a data block of the load image from RAM and checking to ascertain if the data block is the last data block to be transmitted;

(f) transmitting from said PCM insert register a Synchronization Pattern, a Block Number, a checksum and a block of data of said load image, responsive to not encountering the last data block;

(g) repeating steps e and f until the last data of said load image is encountered;

(h) transmitting from said PCM insert register an End of File Pattern, a CRC Pattern, and the number of data blocks of said load image that were transmitted;

(i) transmitting from said PCM insert register a Stop Pattern, signaling to said plurality of digital controllers the end of transmission; and (j) sending to said digital network system via the control/data interface a Sending load complete message.

7. A method for distributing operating program data within a digital network system from the common memory area of said digital network system to a plurality of digital controllers, said method comprising the steps of:

placing a load image of said operating program in a remotely located digital maintenance means;

establishing which of said plurality of digital controllers requires to be loaded with said operating program data;

establishing a PCM network connection from said digital maintenance means to each of said digital controllers that require loading of said operating program data;

transmitting said stored load image from said digital maintenance means via said PCM network connection;

polling each of said connected digital controllers to establish if the load image was received, and disconnecting the digital controllers that were successfully loaded; and repeating the transmission of said load image from said digital maintenance means, and polling each of said connected digital controllers until all of said plurality of digital controllers which required loading have received said operating program data.

* * * * *